A. C. Rauch,
Pump Air Chamber,
№ 28,604.   Patented June 5, 1860.
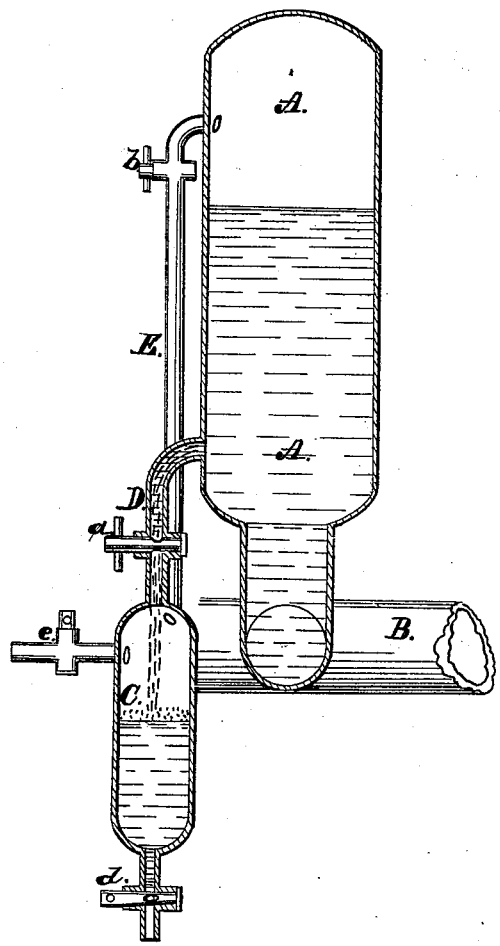
Attest:
Inventor:

UNITED STATES PATENT OFFICE.

A. H. RAUCH, OF BETHLEHEM, PENNSYLVANIA.

DEVICE FOR DRAWING WATER FROM AND SUPPLYING AIR TO THE AIR VESSELS OF PUMPS, &c.

Specification of Letters Patent No. 28,604, dated June 5, 1860.

*To all whom it may concern:*

Be it known that I, A. H. RAUCH, of Bethlehem, in the county of Northampton and State of Pennsylvania, have invented a new and improved device for drawing off water from and supplying air to the air vessels of pumps, hydraulic rams, and other apparatus; and I do hereby declare that the following is a full, clear, and exact description of the same, reference being had to the accompanying drawing, forming part of this specification, said drawing representing a vertical central section of the air vessel of a force-pump with my invention applied.

My invention consists in a novel and simple device whereby the air vessel of a pump may, while the pump is in operation, have a portion of its water exchanged for an equal volume of air at atmospheric pressure as often as the water has by absorption or compression of the air arrived at too high a level in the air vessel. The same device is also applicable in the same manner for a similar purpose to hydraulic rams or any other hydraulic apparatus in which an air vessel may be used.

To enable others skilled in the art to make and use my invention I will proceed to describe its construction and operation.

A, is an ordinary air vessel attached to the force pipe B, of a pump.

C, is an air tight vessel which I call a drainer much smaller than the air vessel A, so arranged that its top is on a level with or below the bottom of that vessel.

D, is a pipe connecting the lower part of the air vessel A, with the upper part of the drainer C, and furnished with a stop cock *a*.

E, is a pipe for connecting the upper part of the air vessel A, with the upper part of the drainer C, and furnished with a stop cock *b*. This pipe instead of being outside the air vessel A, may pass up through the bottom and through the inside to near the top thereof.

*d*, is a cock in the bottom of the drainer C, and *e*, is a cock in the upper part thereof for opening communication with the atmosphere.

The operation of exchanging the water in the vessel A, for air is as follows. The cocks *a*, and *b*, being closed and either or both of those *d*, and *e*, being opened, the drainer C, fills with air at the atmospheric pressure. When the air in the air vessel A, has become so much compressed or has been absorbed by the water till the water rises in it to too high a level, as will be detected by the irregular discharge from the pump, the cocks *e*, and *d*, are both closed and those *a*, and *b*, both opened, and the drainer C, is filled with water from the air vessel A, through the pipe D, and the air discharged from it in a few seconds into the upper part of the air vessel through the pipe E. The cocks *a*, and *b*, being then closed and those *d* and *e* opened, air from the atmosphere enters the drainer C, and the water is discharged from it at *d*. The drainer C, being thus again filled with air the cocks *d*, and *e*, may be closed and the same operation repeated till the air vessel A, is sufficiently relieved of water and supplied with air, which will be ascertained by the regularity of the discharge of water through the pipe B.

The pipe E, and its cock *b*, may be dispensed with as the air in the drainer C, will not fail to rise into the air vessel A, when the cock *d*, is closed and *a*, opened, but the operation will be facilitated and expedited by the said pipe E, and cock *b*, and I prefer generally to use them.

What I claim as my invention and desire to secure by Letters Patent, is—

The drainer C, applied in combination with the air vessel A, and furnished with a system of cocks substantially as herein described whereby the water in the air vessel may be exchanged for air as herein set forth.

A. H. RAUCH.

Witnesses:
R. S. RAUCH,
O. A. GRIDER.